(12) United States Patent
Haines et al.

(10) Patent No.: US 8,534,323 B2
(45) Date of Patent: Sep. 17, 2013

(54) CONTROL VALVES AND METHODS OF FLOWING A MATERIAL THROUGH A CONTROL VALVE

(75) Inventors: Bradford Haines, Spanish Fork, UT (US); Gifford Decker, Springville, UT (US)

(73) Assignee: Flowserve Corporation, Irving, TX (US)

( * ) Notice: Subject to any disclaimer, the term of this patent is extended or adjusted under 35 U.S.C. 154(b) by 1195 days.

(21) Appl. No.: 12/421,774

(22) Filed: Apr. 10, 2009

(65) Prior Publication Data

US 2010/0258754 A1 Oct. 14, 2010

(51) Int. Cl.
*F15C 1/16* (2006.01)

(52) U.S. Cl.
USPC .................................... 137/812; 251/126

(58) Field of Classification Search
USPC ............... 251/118, 120, 122–124, 126, 318, 251/324; 137/812, 625.37
See application file for complete search history.

(56) References Cited

U.S. PATENT DOCUMENTS

| | | | |
|---|---|---|---|
| 1,547,962 A * | 7/1925 | Seewer | 239/482 |
| 2,269,404 A * | 1/1942 | Haven et al. | 251/152 |
| 2,598,187 A * | 5/1952 | Meyer | 251/126 |
| 2,621,015 A * | 12/1952 | MacGregor | 251/50 |
| 4,413,646 A | 11/1983 | Platt et al. | |
| 4,565,210 A | 1/1986 | Heine et al. | |
| 4,761,077 A * | 8/1988 | Werner | 366/165.1 |
| 4,821,768 A * | 4/1989 | Lett | 137/551 |
| 4,827,961 A * | 5/1989 | Nitzberg et al. | 137/68.14 |
| 4,976,462 A * | 12/1990 | Hirata et al. | 236/34.5 |
| 5,549,131 A * | 8/1996 | Maxwell et al. | 137/115.18 |
| 5,605,172 A * | 2/1997 | Schubert et al. | 137/1 |
| 5,617,896 A * | 4/1997 | Tornberg et al. | 137/813 |
| 5,816,446 A * | 10/1998 | Steindorf et al. | 222/1 |
| 5,931,445 A * | 8/1999 | Dvorak et al. | 251/118 |
| 5,964,446 A * | 10/1999 | Walton et al. | 251/127 |
| 6,131,612 A | 10/2000 | Beurskens | |
| 6,280,502 B1 | 8/2001 | van Veen et al. | |

(Continued)

FOREIGN PATENT DOCUMENTS

| | | |
|---|---|---|
| DE | 3717128 A1 * | 12/1988 |
| GB | 2133902 * | 8/1984 |

(Continued)

OTHER PUBLICATIONS

Written Opinion of the International Searching Authority for International Application PCT/US2010/029687, mailed Nov. 11, 2010, 4 pages.

(Continued)

*Primary Examiner* — John K Fristoe, Jr.
*Assistant Examiner* — Marina Tietjen
(74) *Attorney, Agent, or Firm* — TraskBritt (57) ABSTRACT

Valves comprise a valve body having a gallery coupled to an inlet and an outlet to facilitate a fluid flow therethrough. A plug is movably disposed within the valve body and a seat ring assembly may be coupled to the outlet of the valve body. At least one circular motion inducement feature is positioned in a portion of the valve body, the seat ring assembly, or both. The at least one circular inducement feature is configured to induce a circular motion in a fluid flow through the valve. Methods of creating a circular flow in a fluid flowing through a valve are also disclosed.

15 Claims, 6 Drawing Sheets

(56) References Cited

U.S. PATENT DOCUMENTS

| | | |
|---|---|---|
| 6,524,368 B2 | 2/2003 | Betting et al. |
| 6,817,594 B2* | 11/2004 | Pierce .......................... 251/359 |
| 7,650,909 B2* | 1/2010 | Lane et al. .................... 137/810 |
| 7,753,069 B2* | 7/2010 | Nichols et al. ................ 137/204 |
| 2002/0027212 A1* | 3/2002 | Johnson ........................ 251/126 |
| 2003/0070711 A1 | 4/2003 | Bowman et al. |
| 2008/0017819 A1* | 1/2008 | Andoh et al. ................. 251/126 |
| 2008/0023083 A1* | 1/2008 | Muggli et al. ................ 137/592 |
| 2008/0173363 A1 | 7/2008 | Betting |
| 2010/0181517 A1* | 7/2010 | Paz Briz ....................... 251/324 |
| 2011/0303391 A1* | 12/2011 | Streng ...................... 165/104.19 |

FOREIGN PATENT DOCUMENTS

| | | |
|---|---|---|
| JP | 05-027436 U | 4/1993 |
| JP | 07-293709 | 11/1995 |
| WO | 03/016759 A | 2/2003 |

OTHER PUBLICATIONS

International Search Report for International Application PCT/US2010/029687, mailed Nov. 11, 2010, 3 pages.

International Preliminary Report on Patentability for International Application PCT/US2010/029687, mailed Oct. 20, 2011, 5 pages.

* cited by examiner

CONTROL VALVES AND METHODS OF FLOWING A MATERIAL THROUGH A CONTROL VALVE

TECHNICAL FIELD

The present invention relates generally to control valves. More particularly, embodiments of the present invention relate to control valves configured to induce a rotational motion into a flow of materials flowing therethrough.

BACKGROUND

In letdown services, high performance letdown valves are conventionally employed to reduce a flow of a material from a high pressure to a lower pressure. One example of a system employing a letdown valve includes systems for carrying out a conventional pressure acid leaching (PAL) process or high-pressure acid leaching (HPAL) process. An example of such a process was developed at Moa Bay in Cuba in the late 1950s and is sometimes referred to as the Moa Bay process.

An example of a Moa Bay process comprises pulping ore to approximately 40% solids in a fluid, such as water, and then feeding the ore in the slurry form to various compartments of an autoclave. Sulfuric acid is fed into the autoclave to selectively leach materials from the ore slurry at elevated temperatures and pressure (e.g., about 250° C. and 3.62 MPa) to solubilize the various materials. As leaching progresses, the leached slurry is passed to one or more level-control vessels and to one or more letdown stages (i.e., a vessel such as a flash tank) through letdown valves.

The slurry passing through the letdown valves is typically a highly abrasive mixture of solids, liquids and gases flowing at high temperatures and pressures and may be traveling through the letdown valves at relatively high velocities (e.g., as high as mach 1 [343 m/s]). The highly abrasive make-up of the slurry, combined with the high temperatures, pressures and velocities typically result in accelerated wear to the letdown valves and associated components.

Furthermore, the slurry mixture tends to not be homogeneous, resulting in surging of the flow as the mixture exits the letdown valve. Such surges often cause low frequency vibrations in the piping and may result in splashing in the vessel, as well as forces on the plug head of the letdown valve. Splashing inside the vessel accelerates wear to the vessel and reduces the life of the vessel. Similarly, the forces on the plug head of the letdown valve may result in accelerated failure of the letdown valve.

BRIEF SUMMARY

Various embodiments of the present invention comprise control valves configured to induce a rotational or circular motion into a flow of fluid therethrough. In one or more embodiments, the control valve may comprise a gallery comprising a central axis. An outlet may be positioned in communication with the gallery. An inlet may also be positioned in communication with the gallery and may comprise a longitudinal axis that is laterally offset from the central axis of the gallery.

Other embodiments comprise a valve configured to induce a rotational or circular motion into a flow of fluid therethrough. One or more embodiments of such valves may comprise a valve body comprising an inlet and an outlet. Both the inlet and the outlet may be coupled to a gallery and may be configured to facilitate a flow of fluid from the inlet, through the gallery, and to the outlet. A seat ring assembly may be coupled to a portion of the outlet of the valve body. At least one circular motion inducement feature may be positioned in at least one of a portion of the valve body and the seat ring assembly.

In additional embodiments, the present invention comprises methods of creating a circular flow in a fluid flowing through a valve. In at least one embodiment of such a method, a valve body may be provided. The valve body may comprise a flow path from an inlet, through a gallery, and out an outlet. The valve body may further comprise at least one circular motion inducement feature positioned along some portion of the flow path. A fluid may be flowed along the flow path of the valve body and adjacent to the circular motion inducement feature. A circular motion may then be induced into the fluid flow along the flow path.

DETAILED DESCRIPTION

The illustrations presented herein are, in some instances, not actual views of any particular valve, but are merely idealized representations which are employed to describe the present invention. Additionally, elements common between figures may retain the same numerical designation.

In the following description, certain terminology is used to describe certain features of one or more embodiments of the invention. For instance, the term "fluid" refers to a composition capable of flowing through a valve. By way of example and not limitation, a fluid may comprise a liquid, a liquid and gas mixture, a slurry, or a slurry and gas mixture.

Figure 1:
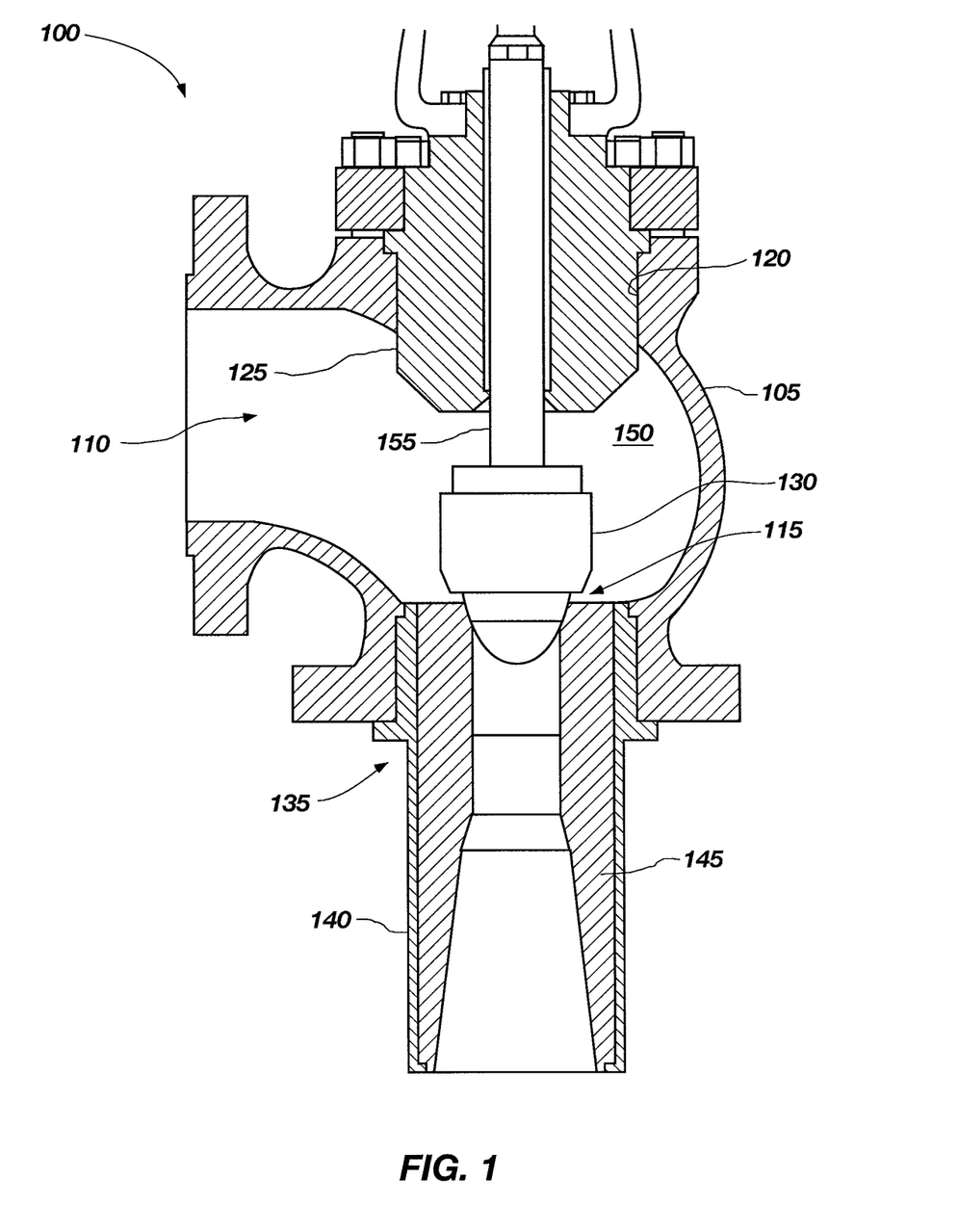
FIG. 1 illustrates a cross-sectional view of a valve according to particular embodiments of the invention.

Various embodiments of the present invention comprise control valves configured to introduce a circular or rotational motion into a fluid flow therethrough. FIG. 1 illustrates a cross-sectional view of a valve 100 according to some embodiments of the invention. The valve 100 comprises a valve body 105 having an inlet 110 and an outlet 115 defining a flow channel through which a fluid may flow. An opening 120 in the upper portion of the valve body 105 may be configured to accept a bonnet 125 and a device to manipulate a plug 130 housed within the valve body 105 or other trim and plug assembly components. The bonnet 125 inserted into the opening 120 may penetrate into the valve body 105. A seat ring assembly 135 may be positioned in the outlet 115, as is known to those of ordinary skill in the art, and may generally comprise a housing 140 and an erosion resistant material 145 defining a throat. The plug 130 comprises a shaft 155 extending outward from the opening 120. The plug 130 is movably disposed within the valve body 105 and is configured to sit flush against a portion of the seat ring assembly 135 when the valve 100 is in a closed position, or to be withdrawn therefrom to allow passage of a fluid when the valve 100 is in an opened position.

Figure 2A:
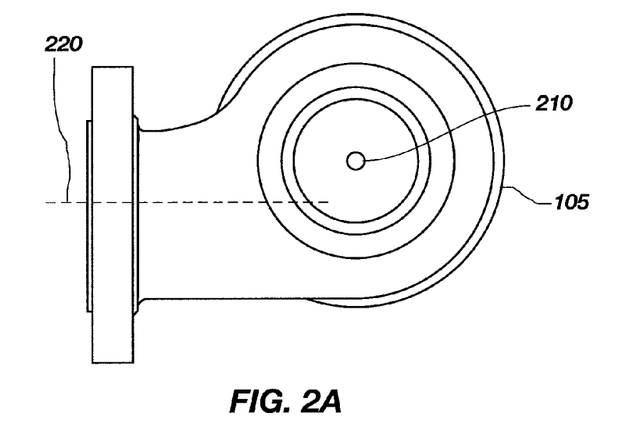
FIG. 2A illustrates a top view of a valve body according to at least one embodiment of the present invention.
Figure 2B:
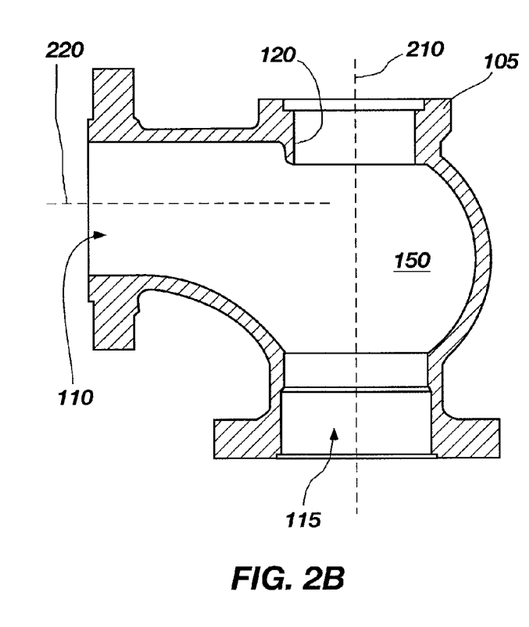
FIG. 2B is cross-sectional elevational view of the valve body of FIG. 2A.
Figure 2C:
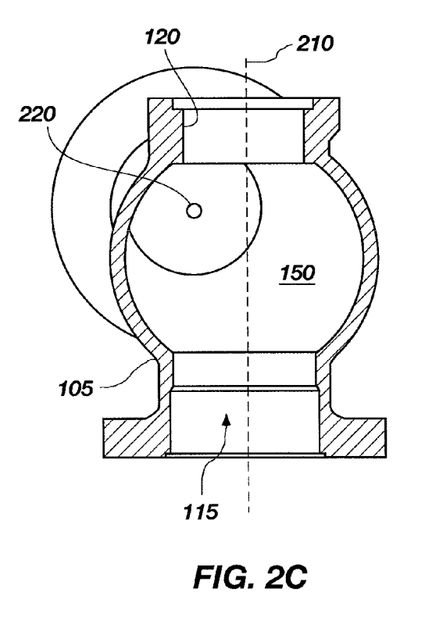
FIG. 2C is a cross-sectional side view of the valve body of FIG. 2A.

In at least some embodiments, the valve body 105 may be configured to induce a circular or swirling motion into the fluid flow through the valve body 105. FIGS. 2A-2C illustrate various views of a valve body 105 comprising an inlet 110 offset from the gallery 150 to induce a circular or swirling motion according to some embodiments of the invention. As shown, the inlet 110 and the outlet 115 are in communication with a gallery 150. In this particular embodiment, the gallery 150 is configured as a globe style gallery which is at least substantially spherical in shape. The gallery 150 has a central axis 210 extending therethrough which, in some embodiments, may be aligned with a longitudinal axis of the outlet 115. The inlet 110 has a longitudinal axis 220 extending therethrough.

The inlet 110 is positioned in communication with the gallery 150 and configured such that the longitudinal axis 220 is laterally offset from the central axis 210 of the gallery 150. In other words, as best illustrated in FIGS. 2A and 2C, the inlet 110 is configured and positioned so that the longitudinal axis 220 of the inlet 110 does not intersect the central axis 210 of the gallery 150. The longitudinal axis 220 of the inlet 110 is laterally offset from the central axis 210 of the gallery 150 a sufficient distance so that a circular or swirling motion is induced in the fluid flow as it enters the gallery 150. In some embodiments, the longitudinal axis 220 of the inlet 110 is laterally offset from the central axis 210 of the gallery 150 such that a portion of an inner sidewall of the inlet 110 may be tangentially aligned with a portion of the inner sidewall of the gallery 150.

Figure 3:
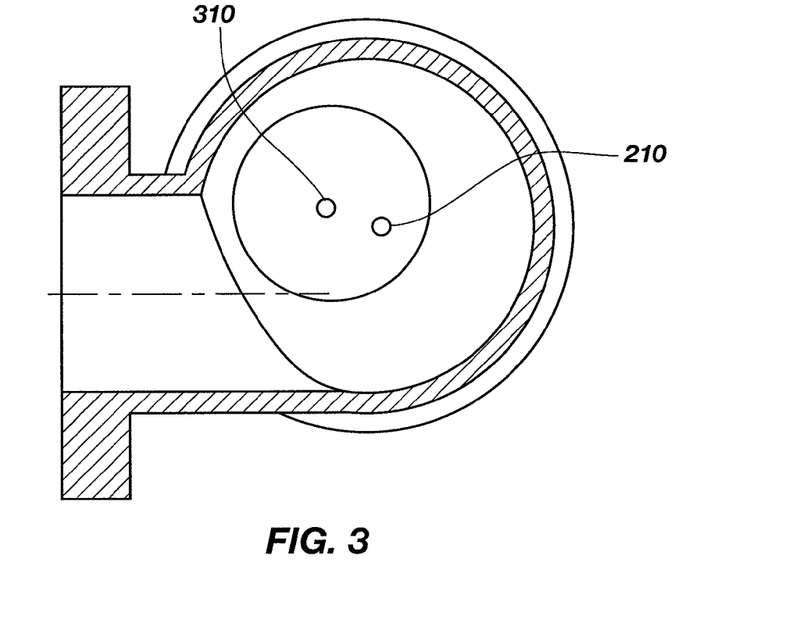
FIG. 3 illustrates a cross-sectional top view of a valve body according to one or more embodiments of the invention.

In other embodiments, such as the embodiment shown in FIG. 3, the outlet 115 may also be positioned in communication with the gallery 150 and configured such that the longitudinal axis 310 is laterally offset from central axis 210 of the gallery 150. In other words, the outlet 115 may be configured and positioned so that the longitudinal axis 310 of the outlet 115 does not intersect the central axis 210 of the gallery 150.

The valve body 105 (FIG. 1) may be formed using casting and machining techniques, known to those of ordinary skill in the art. The valve body 105 may also be formed with different sizes and may be scaled up or down depending upon the desired operation for a valve employing the valve body 105. Furthermore, the valve body 105 may comprise a single integral piece, or a plurality of pieces coupled together.

Figure 4:
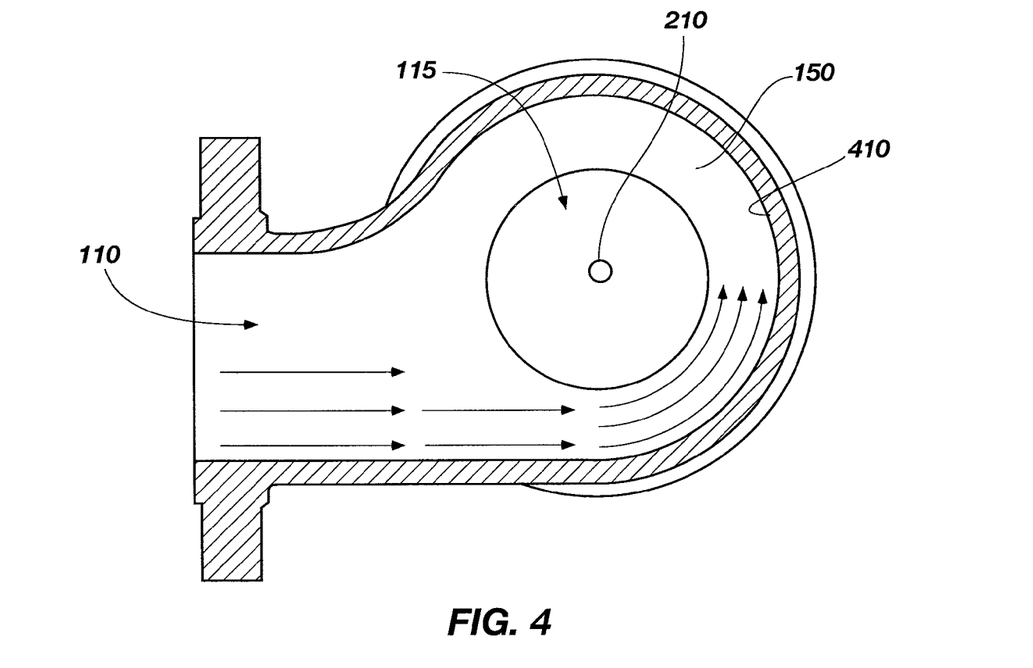
FIG. 4 is a cross-sectional top view of the valve body of FIG. 2A illustrating a fluid flow therethrough.

In use, a fluid is flowed into the valve body 105 of the embodiments illustrated in FIGS. 2A-3 from the inlet 110 and into the gallery 150, as shown by the arrows in FIG. 4. With the inlet 110 laterally offset from the gallery 150, the fluid enters the gallery 150 near to or adjacent to one side of the inner sidewall 410 of the gallery 150. As the fluid flows into the gallery 150 from the offset inlet 110, the fluid initially impacts the inner sidewall 410 of the gallery 150 at an angle less than 90° to the inner sidewall 410 of the gallery 150. The direction of the fluid flow is, therefore, shifted due to the forces acting on the fluid from the inner sidewall 410 of the gallery 150. As the fluid follows the inner sidewall 410 of the gallery 150, a swirling or rotational motion is induced into the fluid flow because of the shape of the gallery 150. The rotation of the fluid flow may be substantially about the central axis 210 of the gallery 150. In the embodiments of FIGS. 2A-3, the fluid flow may continue to rotate as the fluid exits through the outlet 115 of the valve body 105.

Figure 5A:
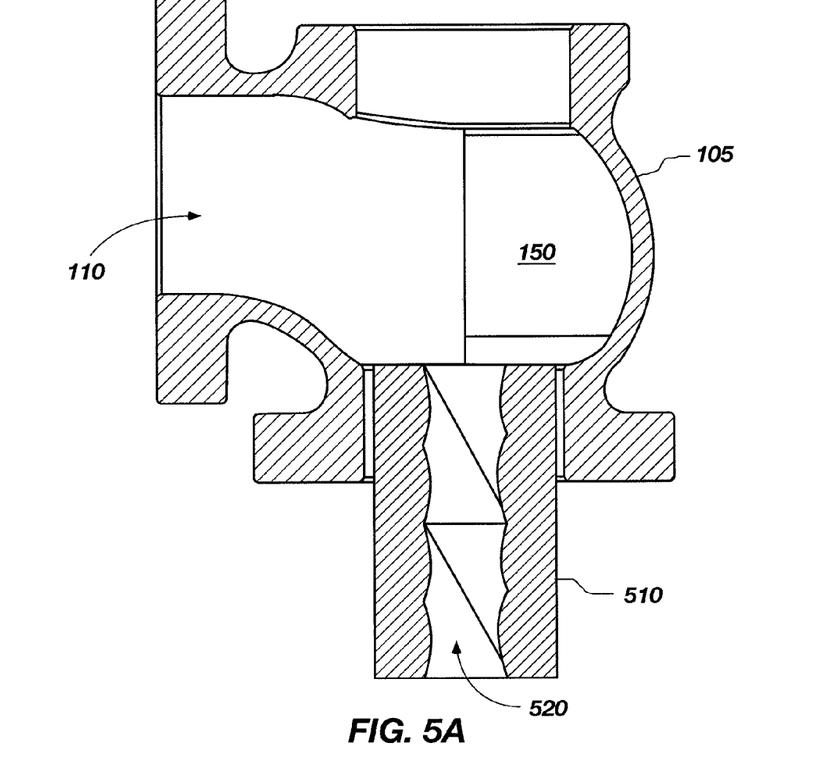
FIG. 5A is a cross-sectional elevational view of a valve body comprising a seat ring assembly configured to induce a rotation into a flow of material therethrough, according to at least one embodiment.
Figure 5B:
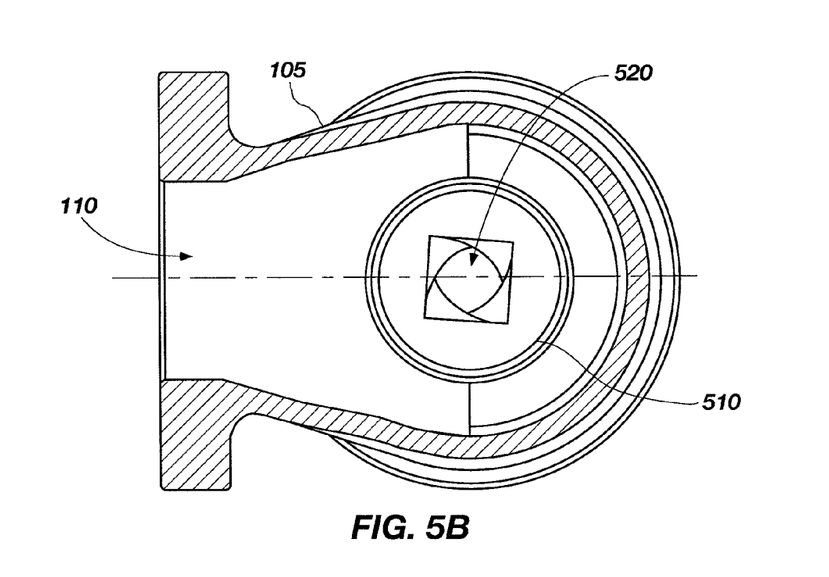
FIG. 5B is a cross-sectional top view of the control valve of FIG. 5A.

In additional embodiments, a seat ring assembly may be configured to induce the circular or rotational motion into the flow of fluid through a valve 100. FIGS. 5A and 5B illustrate an embodiment of such a seat ring assembly 510. The seat ring assembly 510 comprises an aperture 520, also referred to as a channel, defining a shaped throat extending through the seat ring assembly 510. The aperture 520 is shaped and configured to induce the rotational motion into the flow of fluid therethrough. In at least some embodiments, for example, the aperture 520 may comprise a square or rectangular cross section which extends helically along the longitudinal length of the aperture 520. In other words, the aperture 520 may comprise a cube-like shape which is twisted about a longitudinal axis.

The shaped throat may comprise a conventional erosion resistant ceramic material. In at least some embodiments, forming the shaped throat may comprise initially forming a core. For example, a core formed of aluminum may be configured to comprise an outer surface having features correlating to an inner surface of the aperture 520. Thus, if the aperture 520 comprises a helically extending square cross-section, then the core may comprise an outer surface having the same helically extending square cross-section. The erosion-resistant ceramic material comprising the throat may be disposed around the core and pressed under high pressure to form a green, or unsintered ceramic structure around the core. The core may subsequently be extracted, leaving the aperture 520 with the desired shape and configuration. The ceramic material may be sintered to a final density and may be placed in a housing of the seat ring assembly 510.

Figure 6A:
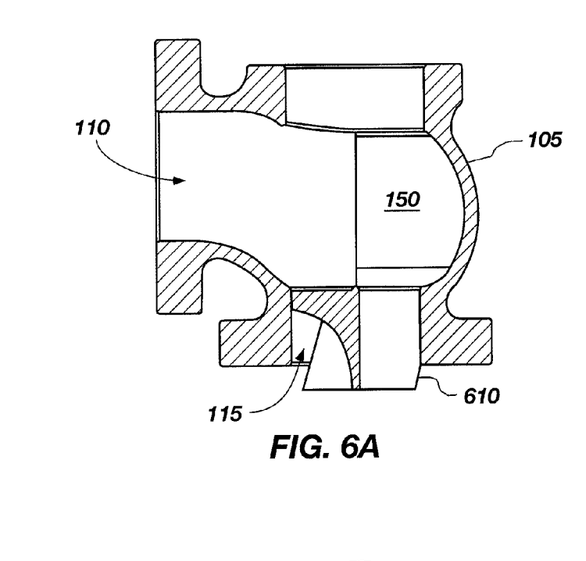
FIG. 6A illustrates a cross-sectional front elevational view of a control valve comprising a plurality of vanes positioned in an outlet or seat ring assembly according to at least one embodiment.
Figure 6B:
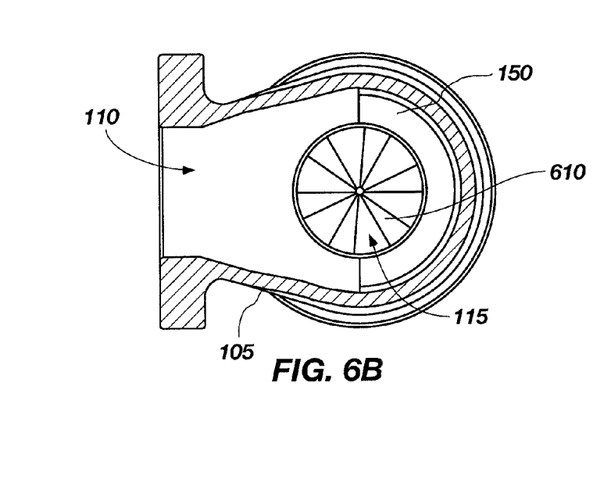
FIG. 6B is a cross-sectional top view of the control valve of FIG. 6A.
Figure 7A:
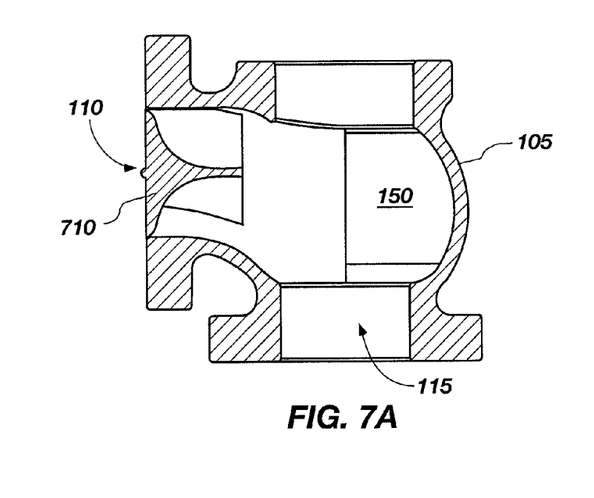
FIG. 7A illustrates a cross-sectional front elevational view of a control valve comprising a plurality of vanes positioned in an inlet of a valve body according to at least one embodiment.
Figure 7B:
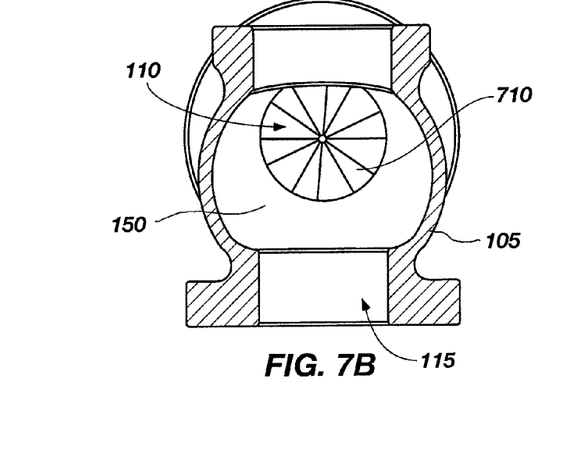
FIG. 7B is a cross-sectional side elevational view of the control valve of FIG. 7A.

In still further embodiments, one or more vanes may be positioned in a portion of the flow path from the inlet 110, through the gallery 150, and to the outlet 115 of the valve body 105. FIGS. 6A and 6B illustrate an embodiment of a valve body 105 comprising a plurality of vanes 610 positioned within at least a portion of the outlet 115. FIGS. 7A and 7B illustrate another embodiment of a valve body 105 comprising a plurality of vanes 710 positioned within at least a portion of the inlet 110. In each embodiment employing one or more vanes, the one or more vanes may be fixedly attached to the valve body 105 so that there is no rotation thereof about an axis. By way of example and not limitation, the plurality of vanes 610, 710 may be configured similar to a plurality of fan blades, except that the plurality of vanes 610, 710 are fixed so that they do not rotate about an axis.

The plurality of vanes 610, 710 may comprise a ceramic material similar to the conventional ceramic materials employed in the throat of a conventional seat ring assembly. In some embodiments, the plurality of vanes 610, 710 may comprise an inlay over which the ceramic material may be disposed. For example, the inlay may comprise a metal or metal alloy, over which a conventional ceramic material is disposed.

By inducing a rotation to the flow of the fluid, the fluid has been found to separate liquid or slurry mixtures from gases present in the fluid flow. For example, in at least some embodiments, a valve 100 may be configured for use in a HPAL process. A slurry comprising a mixture of solids, fluids and gases may flow into the valve body 105 from the inlet 110. As the slurry flows through the valve 100, a rotational motion is induced into the flow. The rotational motion in the flow may cause the liquid and solid mixture to flow to the outer regions of the valve 100, while the gases may flow more internally in the gallery 150.

In some embodiments, the separation of the gases from the liquids (including a slurry having abrasive solids) may allow the liquids to flow at a slower rate than the gases. At extremely high flow rates, such as those seen in conventional letdown valves, the slurry comprising the liquid and solid mixture is extremely abrasive to valve components. By slowing the flow rate of the slurry, the wear to the valve components is substantially reduced. The rotating flow also results in more stabilized fluid flow through the outlet 115 of the valve body 105, as well as through the seat ring assembly 135, 510 and as the slurry exits into a vessel.

Figure 8:
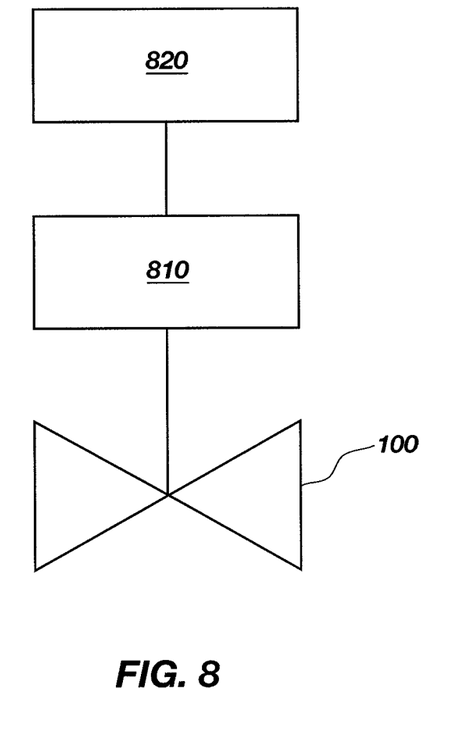
FIG. 8 illustrates a system diagram of a flow control system according to at least one embodiment of the present invention.

Other embodiments of the invention comprise flow control systems. FIG. 8 illustrates a system diagram of a flow control system according to at least one embodiment of the present invention comprising a control valve configured to induce a circular or rotational motion into a flow of a fluid therethrough. The control valve 100 may comprise a valve body configured according to any one or combination of the embodiments described herein above and with reference to FIGS. 2A-7B.

An actuator 810 may be controllably coupled to the shaft 155 of the plug 130 and configured to control the position of the plug 130 (FIG. 1). The actuator 810 may comprise any conventional actuator known in the art. By way of example and not limitation, the actuator 810 may comprise a Valtek-brand actuator, available from Flowserve Company of Irving, Tex. A positioner 820 may be operably coupled to the actuator 810. The positioner 820 may comprise any conventional positioner 820 as is known in the art. By way of example and not limitation, the positioner 820 may comprise a Valtek-brand positioner, such as a four-way Valtek Beta positioner or a Valtek XL series positioner, as well as a Logix 1000 or 2000 series digital positioner, each of which are available from Flowserve Company of Irving, Tex.

Still other embodiments of the invention comprise methods for inducing a rotational motion into a fluid flow through a valve. A fluid, such as a liquid, including a slurry, or a gas, as well as a combination thereof, may be flowed along a flow path of a valve body from an inlet, through a gallery, and out an outlet. In at least some embodiments, the outlet may comprise a seat ring assembly coupled thereto. The fluid may contact at least one circular motion inducement feature inducing a controlled rotation to the flow. In at least some embodiments, the at least one circular motion inducement feature may comprise an inner sidewall of the gallery, such as in the embodiments described with reference to FIGS. 2A-4. In other embodiments, the at least one circular motion inducement feature may comprise the sidewalls of a channel comprising the throat of the seat ring assembly, such as in the embodiments described above with reference to FIGS. 5A and 5B. In still other embodiments, the at least one circular motion inducement feature may comprise one or more vanes fixedly positioned in a portion of the inlet or the outlet, or both, such as in the embodiments described herein with reference to FIGS. 6A-7B. In some embodiments, the method may further comprise at least partially separating a gas flow from a liquid with the rotational fluid flow.

While certain embodiments have been described and shown in the accompanying drawings, such embodiments are merely illustrative and not restrictive of the scope of the invention, and this invention is not limited to the specific constructions and arrangements shown and described, since various other additions and modifications to, and deletions from, the described embodiments will be apparent to one of ordinary skill in the art. Thus, the scope of the invention is only limited by the literal language, and legal equivalents, of the claims which follow.

What is claimed is:

1. A control valve, comprising:
a gallery comprising a central axis;
an outlet in communication with the gallery; and
an inlet in communication with the gallery and comprising a longitudinal axis laterally offset from the central axis of the gallery, wherein the longitudinal axis and the central axis do not intersect, and wherein one side of the inlet extending in a direction parallel to the longitudinal axis of the inlet is tangentially aligned with a portion of an inner sidewall of the gallery; and
a seat ring assembly coupled to the outlet, the seat ring assembly comprising an at least substantially cube-shaped channel extending helically therethrough, wherein the cube-shaped channel has a square-shaped lateral cross section taken in a direction perpendicular to the longitudinal axis of the gallery; and
a seat ring assembly coupled to the outlet, the seat assembly comprising an at least substantially cube-shaped channel extending helically therethrough, wherein the cube-shaped channel has a square-shaped lateral cross section taken in a direction perpendicular to the longitudinal axis of the gallery.

2. The control valve of claim 1, wherein a longitudinal axis of the outlet does not intersect with the longitudinal axis of the inlet.

3. The control valve of claim 1, further comprising at least one vane positioned in at least a portion of the inlet.

4. The control valve of claim 1, further comprising at least one vane positioned in at least a portion of the outlet.

5. The control valve of claim 1, wherein a longitudinal axis of the outlet is laterally offset from the central axis of the gallery.

6. The control valve of claim 1, further comprising:
a plug movably disposed within a portion of the gallery and comprising a shaft coupled thereto;
an actuator operably coupled to the shaft and configured to control a position of the plug within the gallery; and
a positioner operably coupled to the actuator.

7. A method of creating a circular flow in a fluid flowing through a valve, comprising:
providing the valve body of claim 1;
flowing a fluid along a flow path;
inducing a circular motion into the fluid flowing along the flow path.

8. The method of claim 7, further comprising providing at least one vane disposed within a portion of the flow path through the valve body.

9. A valve, comprising:
a valve body comprising an inlet and an outlet each coupled to a gallery and configured to facilitate a fluid flow from the inlet, through the gallery and to the outlet;
a plug movably disposed within the valve body and comprising a shaft coupled thereto;

a seat ring assembly coupled to the outlet of the valve body; and at least one circular motion inducement feature configured to induce a circular motion in a fluid flow about a central axis of the gallery, wherein the at least one circular motion inducement feature comprises at least one vane positioned in the outlet of the valve body;

wherein an inner sidewall of the inlet is tangentially aligned with a portion of an inner sidewall of the gallery, wherein the seat ring assembly comprises an at least substantially cube-shaped channel extending helically therethrough, wherein the cube-shaped channel has a square-shaped lateral cross section taken in a direction perpendicular to the longitudinal axis of the gallery.

10. The valve of claim 9, wherein a longitudinal axis of the inlet laterally is offset from the central axis of the gallery so that the longitudinal axis and the central axis do not intersect.

11. The valve of claim 10, wherein a longitudinal axis of the outlet is laterally offset from the central axis of the gallery.

12. The valve of claim 9, further comprising an actuator controllably coupled to the shaft and configured to control the position of the plug within the valve body.

13. The valve of claim 12, further comprising a positioner controllably coupled to the actuator.

14. A valve comprising:
a valve body comprising an inlet and an outlet each coupled to a gallery and configured to facilitate a fluid flow from the inlet, through the gallery and to the outlet;
a plug moveably disposed within the valve body and comprising a shaft coupled thereto;

a seat ring assembly coupled to the outlet of the valve body; and at least one circular motion inducement configured to induce a circular motion in a fluid flow, wherein the at least one circular motion inducement feature comprises an aperture extending through the seat ring assembly and defining a shaped throat, and wherein the aperture comprises an at least substantially cube shape twisted about a longitudinal axis thereof, the aperture having a square-shaped lateral cross section taken in a direction perpendicular to the longitudinal axis of the aperture.

15. A control valve, comprising:
a gallery comprising a central axis;
the gallery, the outlet having a longitudinal axis extending in a direction parallel to and laterally offset from the central axis of the gallery;
an inlet in communication with the gallery and comprising a longitudinal axis laterally offset from the central axis of the gallery, wherein the longitudinal axis and the central axis do not intersect, and wherein the longitudinal axis of the outlet does not intersect with the longitudinal axis of the inlet; and
further comprising a seat ring assembly coupled to the outlet, the seat ring assembly comprising an at least substantially cube-shaped channel extending helically therethrough, wherein the cube-shaped channel has a square-shaped lateral cross section taken in a direction perpendicular to the longitudinal axis of the gallery.

* * * * *